Dec. 21, 1965  W. HORVATH  3,224,811
BOTTOM DISCHARGE VEHICLE WITH BACKWARD DUMPING MECHANISM
Filed May 14, 1963  2 Sheets-Sheet 1

INVENTOR.
WILLIAM HORVATH
BY OLSEN & STEPHENSON

INVENTOR.
WILLIAM HORVATH
BY
OLSEN & STEPHENSON

United States Patent Office 3,224,811
Patented Dec. 21, 1965

3,224,811
BOTTOM DISCHARGE VEHICLE WITH BACK-
WARD DUMPING MECHANISM
William Horvath, 3051 Jackman Road, Ida, Mich.
Filed May 14, 1963, Ser. No. 280,302
4 Claims. (Cl. 298—10)

This invention relates generally to vehicles of road width and capacity for transporting bulk materials such as sand, earth, etc., and more particularly to a vehicle of this type which has a container body provided with a bottom dump or discharge opening and mounted so that it can be tipped rearwardly for dumping of the body contents behind the vehicle.

Bottom dump vehicles are required for a variety of uses in connection with highway and airport runway building and maintenance and in connection with earth and sand moving operations of other types. In these and similar situations, it is desirable for reasons of economy to be able to utilize such a vehicle for other bulk material transport purposes in which the vehicle contents are best dumped behind the vehicle.

It is an object of this invention, therefore, to provide a versatile vehicle of the above type which is provided with a bottom discharge opening and which can be tipped rearwardly for dumping purposes.

Another object of this invention is to provide a rear dump vehicle having a hinge or pivot located a substantial distance above the vehicle rear wheels and which is dumped through the open top end thereof so as not to restrict the height of the material stockpile formed when the body is dumped, enable the dumping of large chunks of material, and avoid interference of the vehicle with the stockpile.

A further object of this invention is to provide a vehicle of this type employing a wrap-around frame and a firm support of the body on the frame in the transport position, so that the vehicle is of a rugged construction in which the body is maintained in a firmly fixed position during transport of bulk material.

Still another object of this invention is to provide a vehicle of this type with a bottom discharge for the body which can be quickly moved to a partially inverted dumping position for discharging the contents of the body through the open top end thereof at a position rearwardly of the vehicle.

Yet another object of this invention is to provide a bulk material transporting vehicle of the above described type which is simple in construction, economical to manufacture, and which may be used for a variety of purposes over a prolonged service life.

Further objects, features and advantages of this invention will become apparent from a consideration of the following description, the appended claims, and the accompanying drawing in which:

Figure 1:
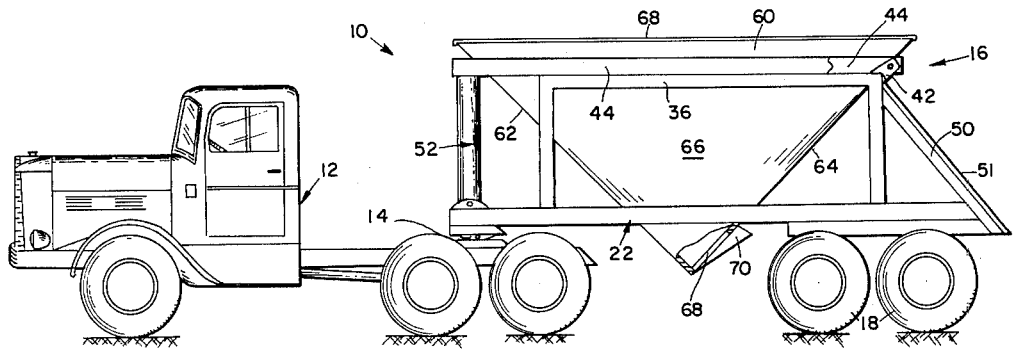
FIGURE 1 is an elevational view of the vehicle of this invention shown in a form in which it constitutes the load carrying portion of a truck, and showing the vehicle body in an upright transport position.

With reference to the drawing, the vehicle of this invention, indicated generally at 10, is illustrated in FIG. 1 as including a conventional tractor 12 having the usual fifth wheel assembly 14, and a trailer 16 which is pivotally connected at its front end, in a conventional manner, to the fifth wheel assembly 14. It is to be understood that the vehicle of this invention may take the form of only the trailer 16 having front wheels, in addition to the rear wheels 18 shown in FIG. 1, and a towing tongue which may be connected to any device capable of towing the vehicle.

Figure 4:
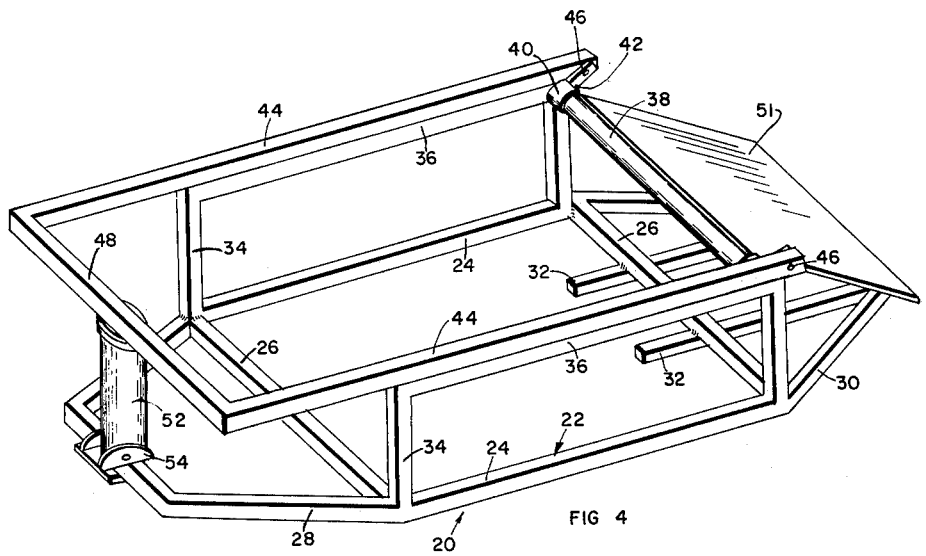
FIGURE 4 is a perspective view of the main and lift frame assembly in the vehicle of this invention.

The trailer 16 includes a main frame 20 (FIG. 4) having a substantially central rectangular portion 22 which consists of side frame members 24 connected by cross frame members 26. This portion 22 of the main frame 20 is commonly referred to as a "wrap-around frame." A front frame extension 28 is secured to and extends forwardly from the frame portion 22 and a rear frame extension 30 extends rearwardly from the wrap-around frame 22. The frame portion 22 and the extensions 28 and 30 are located in substantially the same horizontal plane. Frame members 32 on the rear extension 30 carry the usual springs (not shown) which are supported on the axles for the rear wheels 18.

Upright side frame extensions 34 are provided on each side of the wrap-around frame 22 and are positioned so that they extend upwardly from the frame 22. Each of the upward frame extensions 34 includes a generally horizontal frame member 36 which is located above and in a substantially parallel relation with a wrap-around frame side member 24. The rear ends of the frame members 36 are connected by a connector member 38, which in the illustrated form of the invention consists of an elongated tube or pipe. At its opposite ends, the pipe 38 rotatably supports a pair of short sleeves 40, and an ear 42 is rigidly connected to each of the sleeves 40 for a purpose to appear presently.

Figure 3:
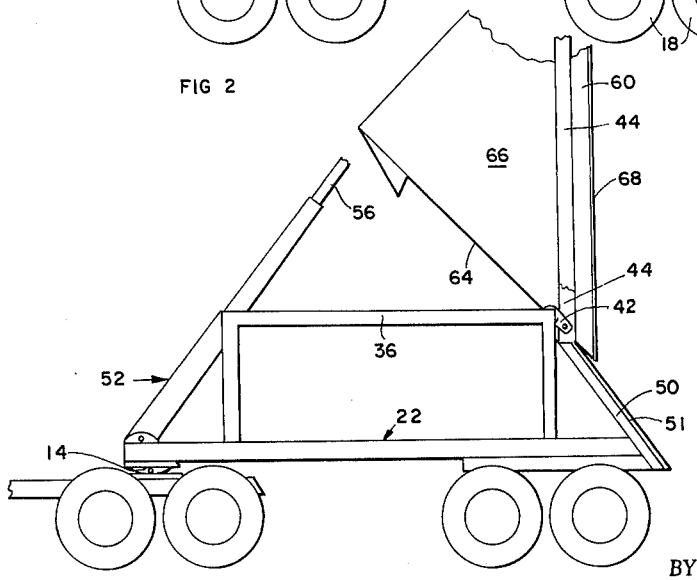
FIGURE 3 is a fragmentary elevational view, illustrated similarly to FIG. 2, of the vehicle of this invention, showing the body in a dumping position.

A pair of substantially parallel lift arms 44 are connected at their rear ends by bolts or the like 46 which extend through the ears 42. The lift arms 44 are of a length such that they project forwardly from the ears 42 beyond the front end of the wrap-around frame 22. At their front ends, the lift arms are connected by a cross bar 48, which thus constitutes an integral part of the lift arms 44. It can thus be seen, that the lift arms 44 are movable up and down about the pipe 38 which functions as a pivot. During such up and down movement, the sleeves 40 rotate about the pipe 38 so that the lift arms 44 are movable between the substantially horizontal transport positions shown in FIGS. 1 and 4, in which the lift arms 44 rest on and are supported by the frame members 36, and substantially upright positions at the rear of the vehicle 10, as shown in FIG. 3. Inclined braces 50 extend between the pipe 38 and the frame extension 30 so as to rigidly support the pipe 38 in its pivot forming position, and a plate or chute 51 is secured to the braces 50 so as to deflect loose material dumped from the body 60 away from the vehicle rear axles.

For moving the lift arms 44 upwardly from their horizontal transport position shown in FIG. 1 to their upright positions shown in FIG. 3 a telescoping hydraulic cylinder assembly 52, of well known construction, is pivotally mounted at its lower end on a bracket 54 carried by the frame extension 28 and has its piston rod 56 pivotally connected to a bracket 58 carried by the cross bar 48 which connects the lift arms 44. It can thus be seen, that upon actuation of the hydraulic cylinder assembly 52 to extend the piston rod 56, the lift arms 44 are movable upwardly and rearwardly about the pipe pivot 38, and upon retraction of the cylinder assembly 52, the lift arms 44 are movable in an opposite direction toward their horizontal positions shown in FIG. 1.

A load carrying body 60, of substantially V shape having a front wall 62, a rear wall 64, side walls 66, only one of which is shown, and an open top end 68, is rigidly mounted on the lift arms 44 and, if desired, may be additionally secured to cross members, such as the cross member 48 which connects the lift arms 44. The body 60, which is constructed so that the lower ends of the front and rear walls 62 and 64 converge and intersect at the lower end of the body, has a discharge or dump opening 68 formed in the rear wall 64 adjacent the lower end thereof. A door 70, of conventional construction, is movably mounted on the body 60 so that it can be moved to a closed position in which it closes the opening 68 and to an open position in which it permits discharge of material from the body 60 through the discharge opening 68.

Figure 2:
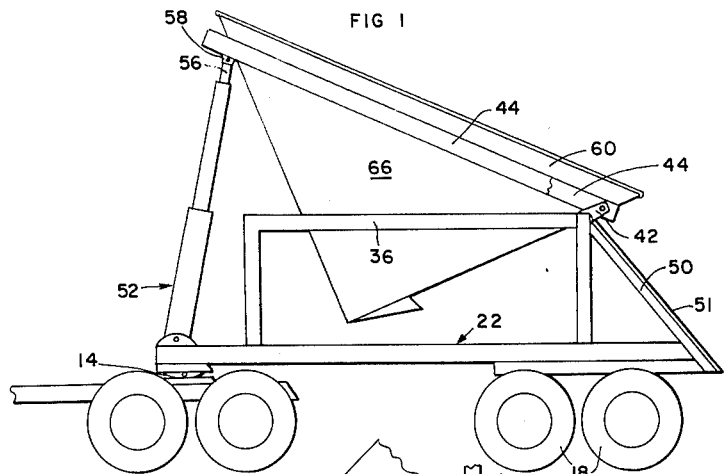
FIGURE 2 is a fragmentary elevational view of the vehicle of this invention, showing the body in an intermediate position as it is being moved between a transport position and a dumping position.

As best appears in FIG. 1, when the body 60 is in its upright transport position, in which the load therein is transported from one location to another, the lift arms 44 are substantially horizontal and are firmly supported over major portions of their lengths directly on the frame members 36 so that the body 60 and its load are firmly supported on the main frame 20. If desired, the contents of the body 60 may be discharged through the opening 68 while the body is in its transport position. However, in the event it is desired to dump the contents of the body 60 rearwardly of the vehicle 10, fluid is supplied from a suitable source (not shown) to the hydraulic cylinder assembly 52 so as to extend the assembly 52. During such extension the body 60 is moved upwardly and rearwardly about the pipe pivot 38 as shown in FIG. 2. In its dumping position, the body 60 has its upper end 68 in a substantially vertical plane so that the entire contents of the body 60 may be discharged rearwardly of the vehicle 10 with the material flowing along the rear body wall 64 and out the open top end 68 of the body.

It can thus be seen that the vehicle 10 has the body 60 firmly supported on the wrap-around frame 22 during transport of the contents of the body 60. However, in the event discharge of these contents rearwardly of the vehicle is desired, the hydraulic cylinder assembly 52 is actuated to partially invert the body 60 as shown in FIG. 3 so that the contents are discharged through the open top end of the body. During dumping the load is moved about a hinge or pivot 38 located a substantial distance above the vehicle rear wheels 18 and adjacent the top of dump body 60. As a result the dumped material is piled high behind the vehicle 10 and when the vehicle 10 pulls away the stock pile is not disturbed. The plate 51 deflects the material away from the vehicle 10.

Figure 5:
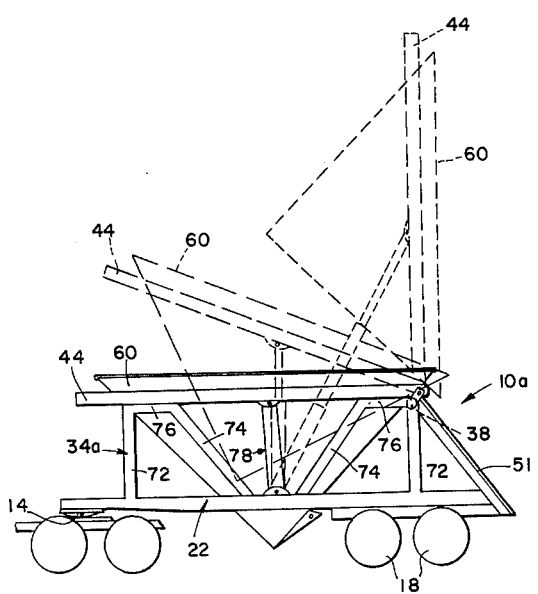
FIGURE 5 is a side elevational view of a modified form of the vehicle of this invention, illustrating the transport position of the body of the vehicle in solid lines and the intermediate and dumping positions of the body in broken lines.

A modified form of the vehicle of this invention is shown in FIG. 5 and indicated generally by the numeral 10a. The vehicle 10a is similar to the vehicle 10 and like numerals are therefore employed on the vehicle 10a to indicate like parts on the vehicle 10. The vehicle 10a differs from the vehicle 10 in the construction of upright frame extensions 34a, only one of which is shown, which are connected to transversely opposite sides of the wrap-around frame 22. In the vehicle 10a, each frame extension 34a includes a pair of upright horizontally spaced posts 72, a pair of inclined relatively upwardly diverging posts 74 and horizontal frame members 76 which connect the upper ends of each pair of posts 72 and 74.

At their lower ends, the posts 74 are spaced apart on each side of the wrap-around frame 22 and a telescoping hydraulic cylinder assembly 78 is pivotally mounted at its lower end on the wrap-around frame 22 and is pivotally connected at its upper end to one of the lift arms 44. The vehicle 10a thus employs a pair of telescoping hydraulic cylinder assemblies 78 in place of the single cylinder assembly 52 in the vehicle 10. In the transport position of the body 60 on the vehicle 10a, the lift arms 44 which support the body 60 are firmly supported on the horizontal frame members 76 in the frame extensions 34a on opposite sides of the body 60. On a supply of fluid to the cylinder assemblies 78, they are extended to move the body 60 upwardly and rearwardly about the pipe support 38 so that the body 60 may be dumped rearwardly of the vehicle 10a.

It will be understood that the bottom discharge vehicle with backward dumping mechanism which is herein disclosed and described is presented for purposes of explanation and illustration and is not intended to indicate limits of the invention, the scope of which is defined by the following claims.

What is claimed is:

1. In a road vehicle having a wheeled main frame which includes a substantially horizontal rectangular portion, upright extensions of said main frame portion on opposite sides thereof, each of said extensions including a substantially horizontal top frame member, a pair of lift members pivotally supported at their rear ends on said extensions for up and down pivotal movement between a transport position in which said lift members rest on said top frame members and extend substantially horizontally of said main frame and a dumping position in which said lift members are substantially vertical, an open top container body having front and rear walls which terminate at their lower ends in downwardly converging portions one of which has a dump opening formed therein, said body being secured adjacent the open top thereof to said lift members so that in said transport position thereof said body is in an upright position in which it projects downwardly through said rectangular frame portion and in said dumping position of said lift arms said body is in a rearwardly tipped position for dumping of the contents thereof through the open top, and lift means on said main frame and engaged with said lift arms for moving said arms from said transport to said dumping position.

2. In a road vehicle having a wheeled main frame, upright extensions of said main frame on opposite sides thereof, each of said extensions including a substantially horizontal top frame member, a pair of lift members pivotally supported at their rear ends on said extensions for up and down pivotal movement between a transport position in which said lift members rest on said top frame members and extend substantially horizontally of said main frame and a dumping position in which said lift members are pivotally moved upwardly, an open top container body having front and rear walls which terminate at their lower ends in downwardly converging portions one of which has a dump opening formed therein, said body being secured to said lift members so that in said transport position thereof said body is in an upright position and in said dumping position of said lift arms said body is in a rearwardly tipped position for dumping of the contents thereof through the open top, and lift means on said main frame and engaged with said lift arms for moving said arms from said transport to said dumping position.

3. In a road vehicle having a wheeled main frame which includes a substantially horizontal rectangular portion, upright extensions of said main frame portion on opposite sides thereof, a pair of lift members pivotally supported at their rear ends on said extensions for up and down pivotal movement between a transport position in which said lift members rest on the top ends of said extensions and extend substantially horizontally of said main frame and a dumping position in which said lift members are moved upwardly, an open top container body having front and rear walls which terminate at their lower ends in downwardly converging portions one of which has a dump opening formed therein, said body being secured adjacent the open top thereof to said lift members so that in said transport position thereof said body is in an upright position and in said dumping position of said lift arms said body is in a rearwardly tipped position for discharge of the contents thereof through the open top, and a hydraulic cylinder assembly on said main frame and engaged with the front ends of said lift arms for moving said arms from said transport to said dumping position.

4. In a road vehicle having a wheeled main frame which includes a substantially horizontal rectangular portion, upright extensions of said main frame portion on opposite sides thereof, a pair of lift members pivotally supported at their rear ends on said extensions for up and down pivotal movement between a transport position in which said lift members rest on the top ends of said extensions and extend substantially horizontally of said main frame and a dumping position in which said lift members are moved upwardly, an open top container body having front and rear walls which terminate at their lower ends in downwardly converging portions one of which has a dump opening formed therein, said body being secured adjacent the open top thereof to said lift members so that in said transport position thereof said body is in an upright position and in said dumping position of said lift arms said body is in a rearwardly tipped position for discharge of the contents thereof through the open top, and a pair of hydraulic cylinder assemblies on transversely opposite sides of said main frame engaged with said lift arms for moving said arms from said transport to said dumping position.

References Cited by the Examiner

UNITED STATES PATENTS

| 955,875 | 4/1910 | Hunt | 298—7 |
| 1,104,801 | 7/1914 | Hunt | 298—7 |
| 2,738,633 | 3/1956 | Bestland. | |
| 2,889,172 | 6/1959 | Hoff | 298—10 |
| 2,963,185 | 12/1960 | Jones | 214—505 |

FOREIGN PATENTS 606,570  10/1960  Canada.

BENJAMIN HERSH, *Primary Examiner.*

RALPH B. BLAKESLEE, ARTHUR L. LA POINT,
*Examiners.*